(12) United States Patent
Huizen et al.

(10) Patent No.: US 11,597,321 B2
(45) Date of Patent: Mar. 7, 2023

(54) EXTERIOR REARVIEW MIRROR ASSEMBLY

(71) Applicant: Magna Mirrors of America, Inc., Holland, MI (US)

(72) Inventors: Gregory A. Huizen, Hudsonville, MI (US); Robert L. Esser, Rockford, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 0 days.

(21) Appl. No.: 17/935,975

(22) Filed: Sep. 28, 2022

(65) Prior Publication Data

US 2023/0021221 A1    Jan. 19, 2023

Related U.S. Application Data

(63) Continuation of application No. 17/302,184, filed on Apr. 27, 2021, now Pat. No. 11,458,895.

(60) Provisional application No. 62/704,191, filed on Apr. 27, 2020.

(51) Int. Cl.
*B60R 1/06* (2006.01)
*B62D 65/00* (2006.01)

(52) U.S. Cl.
CPC ............... *B60R 1/06* (2013.01); *B62D 65/00* (2013.01)

(58) Field of Classification Search
CPC ......... B60R 1/072; B60R 1/1207; B60R 1/06; B60R 1/12; B62D 65/00
See application file for complete search history.

(56) References Cited

U.S. PATENT DOCUMENTS

| | | |
|---|---|---|
| 5,371,659 A | 12/1994 | Pastrick et al. |
| 5,497,306 A | 3/1996 | Pastrick |
| 5,669,699 A | 9/1997 | Pastrick et al. |
| 5,703,731 A | 12/1997 | Boddy et al. |
| 5,786,772 A | 7/1998 | Schofield et al. |
| 5,823,654 A | 10/1998 | Pastrick et al. |
| 5,900,999 A | 5/1999 | Huizenga et al. |
| 5,929,786 A | 7/1999 | Schofield et al. |
| 5,986,364 A | 11/1999 | Bingle et al. |
| 6,176,602 B1 | 1/2001 | Pastrick et al. |
| 6,198,409 B1 | 3/2001 | Schofield et al. |
| 6,213,612 B1 | 4/2001 | Schnell et al. |
| 6,227,689 B1 | 5/2001 | Miller |
| 6,229,226 B1 | 5/2001 | Kramer et al. |

(Continued)

*Primary Examiner* — Lee A Holly
(74) *Attorney, Agent, or Firm* — Honigman LLP (57) ABSTRACT

A vehicular exterior rearview mirror assembly includes a base portion configured for attachment at an exterior portion of a vehicle, a mirror head having a mirror reflective element, and an actuator within the mirror head. When the mirror actuator is electrically operated, the mirror actuator moves the mirror head and the mirror reflective element together and in tandem relative to the base portion. The mirror reflective element is adhesively attached at a mirror back plate. The mirror back plate is attached at a head mounting plate, which is attached at the mirror actuator. A service recess is at and between the mirror back plate and the head mounting plate and is accessible from exterior the mirror head. The service recess is configured to enable detachment of the mirror back plate, with the mirror reflective element adhesively attached thereto, from the head mounting plate.

30 Claims, 8 Drawing Sheets

(56) References Cited

U.S. PATENT DOCUMENTS

| | | |
|---|---|---|
| 6,243,218 B1 | 6/2001 | Whitehead |
| 6,276,821 B1 | 8/2001 | Pastrick et al. |
| 6,312,135 B1 | 11/2001 | Polzer |
| 6,315,419 B1 | 11/2001 | Platzer, Jr. |
| 6,362,548 B1 | 3/2002 | Bingle et al. |
| 6,467,920 B2 | 10/2002 | Schnell et al. |
| 6,522,451 B1 | 2/2003 | Lynam |
| 6,582,109 B2 | 6/2003 | Miller |
| 6,685,864 B2 | 2/2004 | Bingle et al. |
| 6,698,905 B1 | 3/2004 | Whitehead |
| 6,717,712 B2 | 4/2004 | Lynam et al. |
| 6,755,544 B2 | 6/2004 | Schnell et al. |
| 6,916,100 B2 | 7/2005 | Pavao |
| 7,073,914 B2 | 7/2006 | Pavao |
| 7,080,914 B1 | 7/2006 | Boddy |
| 7,090,363 B1 | 8/2006 | Boddy et al. |
| 7,093,946 B2 | 8/2006 | Barve et al. |
| 7,097,312 B2 | 8/2006 | Platzer, Jr. |
| 7,104,663 B2 | 9/2006 | Whitehead |
| 7,126,456 B2 | 10/2006 | Boddy et al. |
| 7,159,992 B2 | 1/2007 | Foote |
| 7,167,294 B2 | 1/2007 | Lynam et al. |
| 7,195,381 B2 | 3/2007 | Lynam et al. |
| 7,253,723 B2 | 8/2007 | Lindahl et al. |
| 7,255,451 B2 | 8/2007 | McCabe et al. |
| 7,267,449 B1 | 9/2007 | Boddy et al. |
| 7,289,037 B2 | 10/2007 | Uken et al. |
| 7,314,285 B2 | 1/2008 | Ruse et al. |
| 7,360,932 B2 | 4/2008 | Uken et al. |
| 7,420,756 B2 | 9/2008 | Lynam |
| 7,492,281 B2 | 2/2009 | Lynam et al. |
| 7,581,859 B2 | 9/2009 | Lynam |
| 7,589,883 B2 | 9/2009 | Varaprasad et al. |
| 7,626,749 B2 | 12/2009 | Baur et al. |
| 7,722,199 B2 | 5/2010 | DeWard et al. |
| 7,748,856 B2 | 7/2010 | Zhao |
| 7,815,348 B2 * | 10/2010 | Pastrick ............... B60Q 1/2665 362/540 |
| 7,887,202 B1 | 2/2011 | Peterson |
| 7,944,371 B2 | 5/2011 | Foote et al. |
| 8,049,640 B2 | 11/2011 | Uken et al. |
| 8,058,977 B2 | 11/2011 | Lynam |
| 8,154,418 B2 | 4/2012 | Peterson et al. |
| 8,267,534 B2 | 9/2012 | Lynam |
| 8,508,831 B2 | 8/2013 | De Wind et al. |
| 8,529,108 B2 | 9/2013 | Uken et al. |
| 8,534,887 B2 * | 9/2013 | DeLine ................... B60R 1/12 348/148 |
| 8,730,553 B2 | 5/2014 | De Wind et al. |
| 8,764,256 B2 | 7/2014 | Foote et al. |
| 8,786,704 B2 | 7/2014 | Foote et al. |
| 8,915,601 B2 | 12/2014 | Foote et al. |
| 9,067,541 B2 | 6/2015 | Sobecki et al. |
| 9,346,403 B2 | 5/2016 | Uken et al. |
| 9,487,142 B2 | 11/2016 | Sobecki et al. |
| 9,598,016 B2 | 3/2017 | Blank et al. |
| 9,827,913 B2 | 11/2017 | De Wind et al. |
| 10,099,618 B2 | 10/2018 | Foote et al. |
| 11,458,895 B2 | 10/2022 | Huizen et al. |
| 2007/0002477 A1 | 1/2007 | Whitehead |
| 2008/0225421 A1 | 9/2008 | Platzer |
| 2014/0313563 A1 | 10/2014 | Uken et al. |
| 2015/0097955 A1 | 4/2015 | De Wind et al. |
| 2020/0223364 A1 | 7/2020 | Peterson et al. |
| 2020/0353867 A1 | 11/2020 | Huizen et al. |

* cited by examiner

EXTERIOR REARVIEW MIRROR ASSEMBLY

CROSS REFERENCE TO RELATED APPLICATION

The present application is a continuation of U.S. patent application Ser. No. 17/302,184, filed Apr. 27, 2021, now U.S. Pat. No. 11,458,895, which claims the filing benefits of U.S. provisional application Ser. No. 62/704,191, filed Apr. 27, 2020, which is hereby incorporated herein by reference in its entirety.

FIELD OF THE INVENTION

The present invention relates generally to the field of rearview mirror assemblies for vehicles and, more particularly, to an exterior rearview mirror assembly that is operable to provide an adjustable rearward field of view for a driver of an equipped vehicle.

BACKGROUND OF THE INVENTION

Typically, an exterior rearview mirror assembly includes a mirror actuator that is operable to adjust a mirror reflective element relative to the mirror casing so as to adjust a rearward field of view of the mirror reflective element of the mirror assembly for viewing by the driver of the vehicle. The reflective element and actuator are disposed in the mirror casing and the actuator adjusts the reflective element relative to the mirror casing. In such conventional exterior mirror assemblies, operation of the mirror actuator does not adjust or move the position of the mirror casing. In such conventional exterior rearview mirror assemblies, a powerfold actuator disposed at a mounting structure can be operable to pivot or fold the mirror casing relative to the side of the vehicle.

SUMMARY OF THE INVENTION

The present invention provides an exterior rearview mirror assembly configured for mounting at an exterior portion of a vehicle. The exterior rearview mirror assembly comprises a mirror head and includes a mirror actuator that is operable to pivot and adjust the mirror head relative to a mounting arm or base that attached at the side of the vehicle. The mirror head comprises a mirror casing, a mirror reflective element attached (such as taped or adhered) at a mirror back plate, and a head mounting plate attached at the mirror casing, that move/adjust together similarly and in tandem with movement/adjustment of the mirror head relative to the mounting arm/base that is attached at the side of the vehicle. The mirror back plate is attached at the head mounting plate (such as snap-attached via a plurality of tabs or flexible elements), and is detachably attached at the head mounting plate so the reflective element can be removed from the head mounting plate and from the mirror head. The mirror head includes an access or service recess or port that allows an operator or service technician to readily detach the mirror back plate (and reflective element attached thereat) from the head mounting plate, such as for service or replacement of the mirror reflective element. The service recess is established at and between the mirror back plate and the head mounting plate and is accessible from exterior the mirror head and mirror casing. The service recess is configured to receive a separating or detaching element that, when received in the service recess, imparts a separating force at and between the mirror back plate and the head mounting plate to detach at least a portion of the mirror back plate from the head mounting plate (such as via detaching at least one the plurality of tabs or flexible elements). At least a part of the service recess may be formed at a portion of the mirror back plate and/or at a portion of the head mounting plate.

Movement/adjustment of the mirror head by operation of the mirror actuator causes the mirror reflective element to move/adjust similarly and in tandem with movement/adjustment of the mirror head so that, via operation of the mirror actuator by a driver of the vehicle, the rearward field of view of the mirror reflective element as viewed by the driver of the vehicle can be set to that driver's desires/needs. The mirror assembly may also include a powerfold actuator that provides a powerfold adjustment to move the mirror head relative to the side of the vehicle from an extended position (used during normal driving of the vehicle) to a folded-to-the-vehicle/stowed position (used during such as when the vehicle is parked and is not being driven normally).

These and other objects, advantages, purposes and features of the present invention will become apparent upon review of the following specification in conjunction with the drawings.

DESCRIPTION OF THE PREFERRED EMBODIMENTS

An exterior rearview mirror assembly of the present invention may comprise dual actuators and dual pivot axes for adjusting a mirror head and reflective element relative to a side of a vehicle at which the mirror assembly is mounted. The mirror assembly may utilize aspects of the mirror assemblies described in U.S. Publication Nos. US-2020-0353867 and/or US-2020-0223364, and/or U.S. Pat. Nos. 10,099,618; 9,827,913; 9,487,142; 9,346,403 and/or 8,915,601, which are all hereby incorporated herein by reference in their entireties.

Referring now to the drawings and the illustrative embodiments depicted therein, an exterior rearview mirror assembly 10 includes a mirror head 12 pivotally mounted at a mounting arm or base portion 14 (that fixedly attaches such as via bolts at the vehicle, and such as via bolting at a front door portion of the vehicle). The mirror head 12 includes a mirror casing or housing 16 that houses an actuator, with a mirror reflective element 18 attached at the actuator (via a back plate 20 and a head mounting plate 22 and actuator adaptor plate 24). The actuator is operable to adjust the mirror reflective element relative to the mounting arm or base 14 to adjust the driver's rearward view at the mirror reflective element. The mirror reflective element is fixed relative to the casing (via the back plate attached at the head mounting plate) so that the actuator, when electrically operated, adjusts the mirror reflective element together and in tandem with the mirror back plate, head mounting plate and mirror casing relative to the mounting arm to provide the desired view for the driver of the vehicle. Optionally, the actuator (or another actuator at the base portion) may provide a powerfold function that pivots the mirror head relative to the side of the vehicle between a use position and a folded position. Thus, the mirror reflective element 18 is attached at a mirror or glass back plate 20 that is received at a head mounting plate 22 and actuator adapter plate 24 within the casing 16 of the mirror head.

Figure 6:
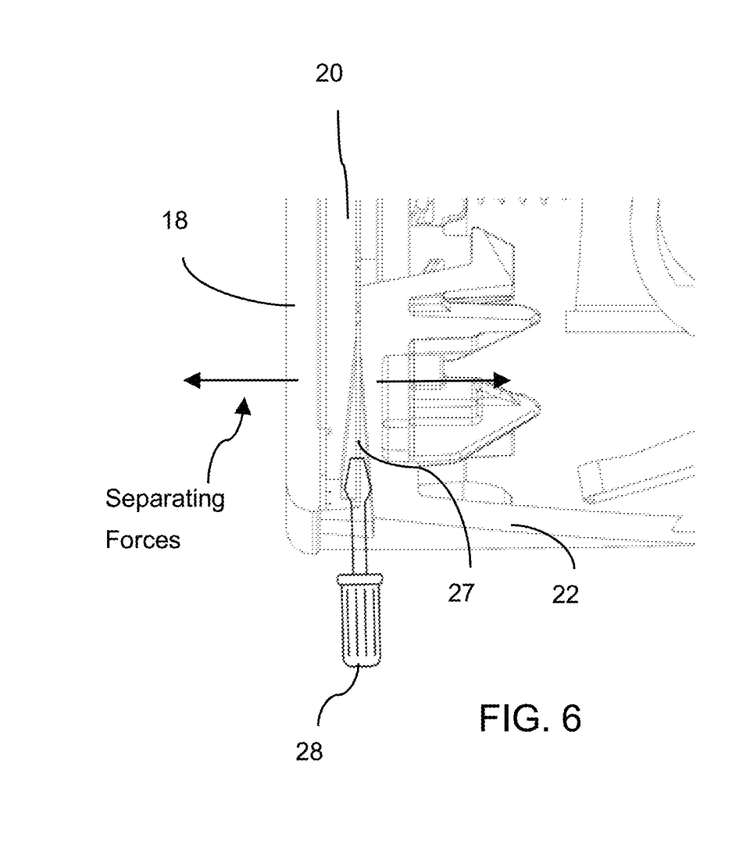
FIG. 6 is a sectional view of a portion of the exterior rearview mirror assembly, showing a tool being inserted into the service port.
Figure 7:
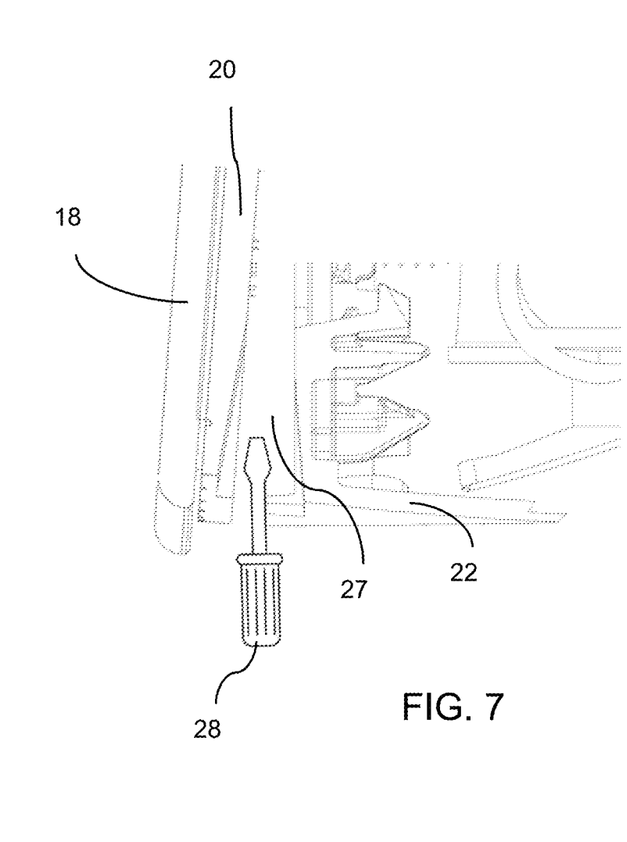
FIG. 7 is another sectional view of the portion of the exterior rearview mirror assembly, showing the tool being further inserted into the service port to detach the mirror back plate from the head mounting plate.

The mirror head includes a reflective element servicing port 26 located at the mirror housing 16 near the bottom edge of the reflective element 18 and provides access and/or exposes at least a portion of the back plate 20 and head mounting plate 22. The port 26 allows for a separating element or tool 28 (FIGS. 6 and 7) to be inserted into a wedge-shaped recess 27 or interface between the glass back plate 20 and the head mounting plate 22. As shown in FIGS. 6 and 7, the tool insertion causes a separation force between the glass back plate and head mounting plate as the tool is inserted into the service port 26 (such as a notch or opening at the mirror casing 16) and the wedge-shaped recess 27, releasing attachment features between the two components to at least partially detach the back plate 20 from the head mounting plate 22. Thus, in situations where the reflective element may be cracked or otherwise damaged, the reflective element (and mirror back plate) may be readily detached from the head mounting plate and the mirror head for service or replacement of the reflective element, without having to detach and replace the entire mirror head or mirror assembly. In other words, the service port 26 and wedge shaped recess 27 allow for the removal of the mirror reflective element 18 and back plate 20 from the head mounting plate 22 at the casing 16 so that the mirror reflective element 18 may be serviced or replaced while the mounting arm 14 and mirror casing 16 (with the head mounting plate, actuator, and actuator adapter plate) remains mounted at the vehicle.

In the illustrated embodiment, the recess 27 comprises a wedge-shaped recess at the lower region of the mirror head and is shaped to receive the tool 28 (such as a flat-head screwdriver or other wedge-shaped tool or separating element) therein. As can be seen with reference to FIGS. 3A-7, the wedge-shaped recess extends from the servicing port 26 at the exterior surface of the mirror head and may be partially formed at the rear of the back plate 20 and partially formed at the front of the head mounting plate 22 (or optionally may be entirely formed at the rear of the back plate or at the front of the head mounting plate). That is, the recess may be defined by a wedge shaped displacement through the otherwise planar surfaces of the rear of the back plate 20 and/or the front of the head mounting plate 22 (either alone or in combination). This provides the wedge-shaped gap between a portion of the connected surfaces of the back plate 20 and head mounting plate 22. Thus, when the tool is inserted into the port 26 and further into the recess 27, the tool imparts a separating force (FIG. 6) at the lower region of the reflective element back plate 20 and the head mounting plate 22 to unsnap or detach at least the lower part of the back plate 20 from the head mounting plate 22 (such as via releasing one or more snap elements at or near the port and recess and/or at and along the lower region of the mirror reflective element). After the lower attachment elements are detached, a gap between the back plate (with mirror reflective element) and the head mounting plate is created that allows for further removal of the mirror reflective element from the casing and head mounting plate. For example, the mirror reflective element and back plate may be grasped by the operator or technician and further and fully detached from the head mounting plate, such as by manual force or use of a tool to further detach the back plate and head mounting plate. With the back plate at least partially separated from the head mounting plate, the operator or technician may also detach an electrical connection between the casing and the mirror reflective element and/or back plate (such as to power a heater pad disposed between the back plate and mirror reflective element).

Thus, the mirror reflective element 18 is attached to the back plate 20, which is detachably snap-attached at the head mounting plate 22, which has the mirror casing 16 attached thereto. A front side of the mirror reflective element 18, when installed at the mirror head, is viewable by the driver of the vehicle and a rear side of the mirror reflective element attaches to the polymeric injection molded mirror backing plate 20. The backing plate 20, at a front side, supports the mirror reflective element (and typically with a heater pad disposed therebetween), and at a rear side (that is opposite the front side and separated from the front side by a thickness of the back plate) includes structure for detachably attaching to a front side of the polymeric injection molded head mounting plate 22, which is attached (at a rear side of the head mounting plate) at the mirror actuator via the actuator adaptor plate 24. The backing plate and/or structure may utilize aspects of the mirror assemblies described in U.S. Publication No. US-2020-0353867 and/or U.S. Pat. Nos. 8,058,977; 7,944,371 and/or 7,581,859, which are hereby incorporated herein by reference in their entireties.

Figure 8:
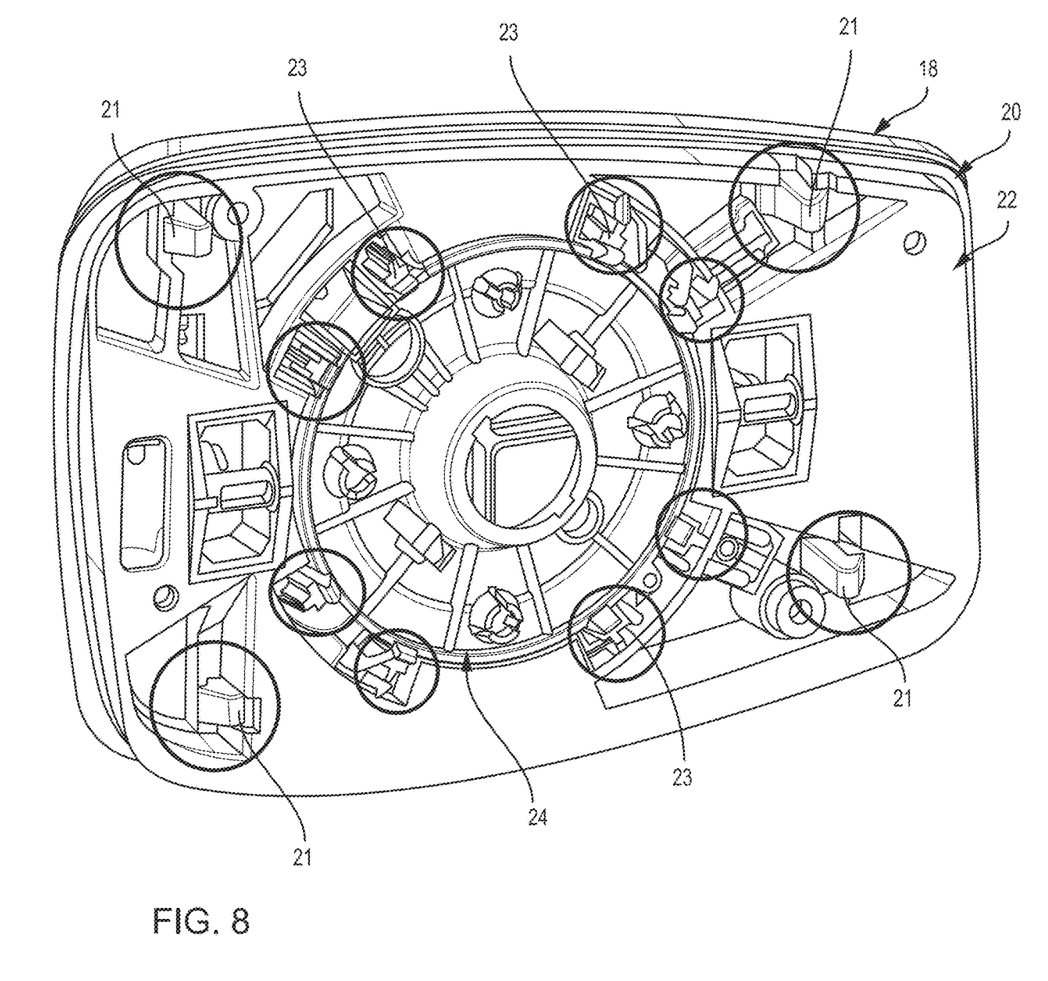
FIG. 8 is a perspective view of the head mounting plate with the mirror back plate snap-attached thereat.

As shown in FIG. 8, the back plate 20 is attached to the actuator through the head mounting plate 22, which is snap-attached at the actuator adapter plate 24. The back plate 20 attaches to the head mounting plate 22 via a plurality (such as four) of attachment clips 21 on the outer perimeter of the back plate 20 (highlighted by the larger circles in FIG. 8). The attachment clips 21, when the back plate 20 is attached to the head mounting plate 22, are received through corresponding structure (such as openings in the head mounting plate) and attach to receiving portions of the mounting plate 22. The attachment connection between the back plate 20 and the head mounting plate may be further supported via a plurality (such as eight) bosses 23 of the back plate 20 passing through the head mounting plate 22 and optionally engaging the actuator adapter plate 24 (highlighted by the smaller circles in FIG. 8). Optionally, the head mounting plate 22 may be snap-attached to the actuator adapter plate 24 or may be fastened to the actuator adapter plate by a radial pattern of screws or fasteners. The actuator adapter plate 24 is pivotally attached to the actuator body so that when the actuator is operated to adjust the mirror reflective element, the actuator pivots the actuator adapter plate and therefore pivots the head mounting plate, back plate, and mirror reflective element which are all fixed relative to one another with the casing.

When service of the mirror assembly or replacement of the mirror reflective element is warranted, a tool 28 may be inserted into the port 26 and into the wedge-shaped recess 27 to impart a separating force on to the back plate 20 and head mounting plate 22 to detach or unsnap the lower clips 21 from the head mounting plate 22 so that at least the lower portion of the mirror reflective element and back plate are detached from the head mounting plate. The separating force may also detach or unsnap one or more of the bosses 23 attached at the actuator adapter plate (and particularly the bosses attached at the lower portion of the actuator adapter plate). Although shown and described as a tool similar to a flat-head screwdriver, any suitable tool may be used that can be inserted into the wedge-shaped recess to cause the separation of the mirror back plate from the head mounting plate. For example, a tool may be inserted into the recess in one orientation and then rotated to change its orientation in the recess to impart the separation forces at the back plate and head mounting plate. Optionally, the separation force may be applied without an independent tool, such as by a structure of the mirror head. For example, instead of a recess for receiving a tool, the mirror head may include an element that can be pushed into a wedge-shaped recess or that may be twisted or rotated to impart the separation forces at the back plate and head mounting plate. For example, a screw may be disposed at the wedge-shaped recess that, when rotated, is driven upward into the narrower end of the wedge-shaped recess to impart the separating forces.

Figure 1:
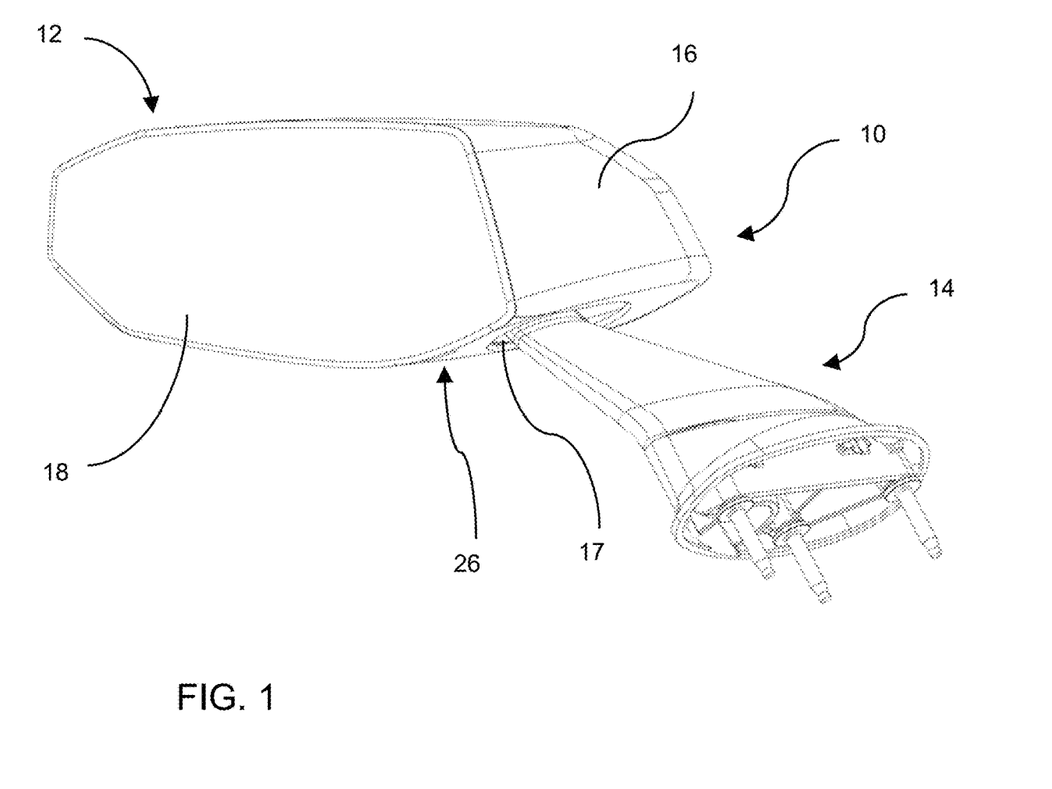
FIG. 1 is a perspective view of an exterior rearview mirror assembly in accordance with the present invention.
Figure 2:
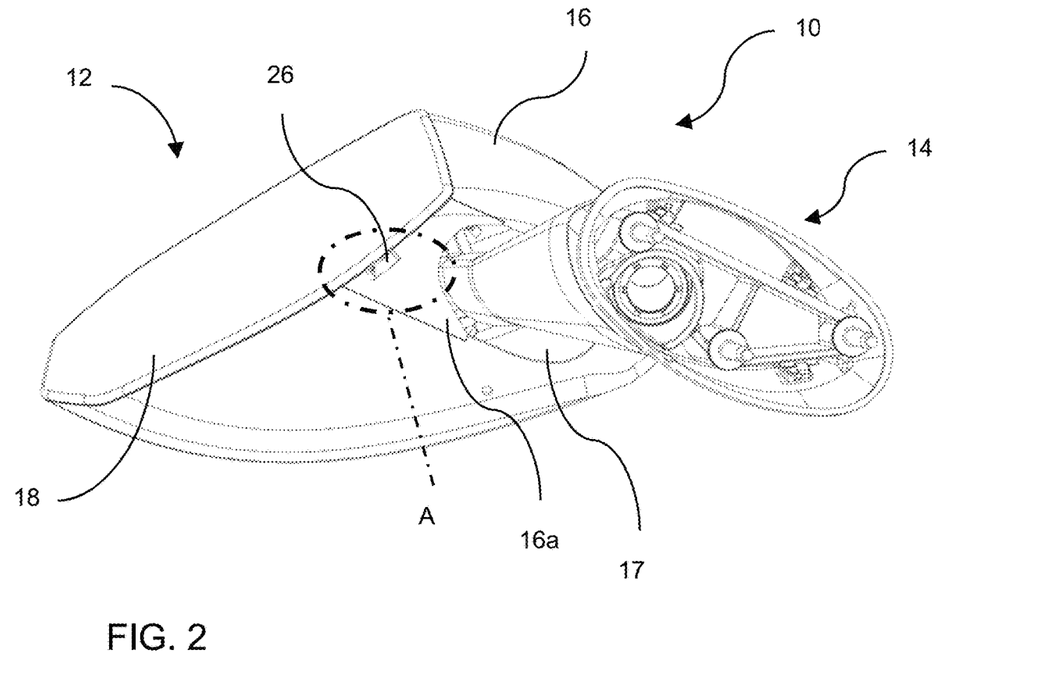
FIG. 2 is another perspective view of the exterior rearview mirror assembly.
Figure 2A:
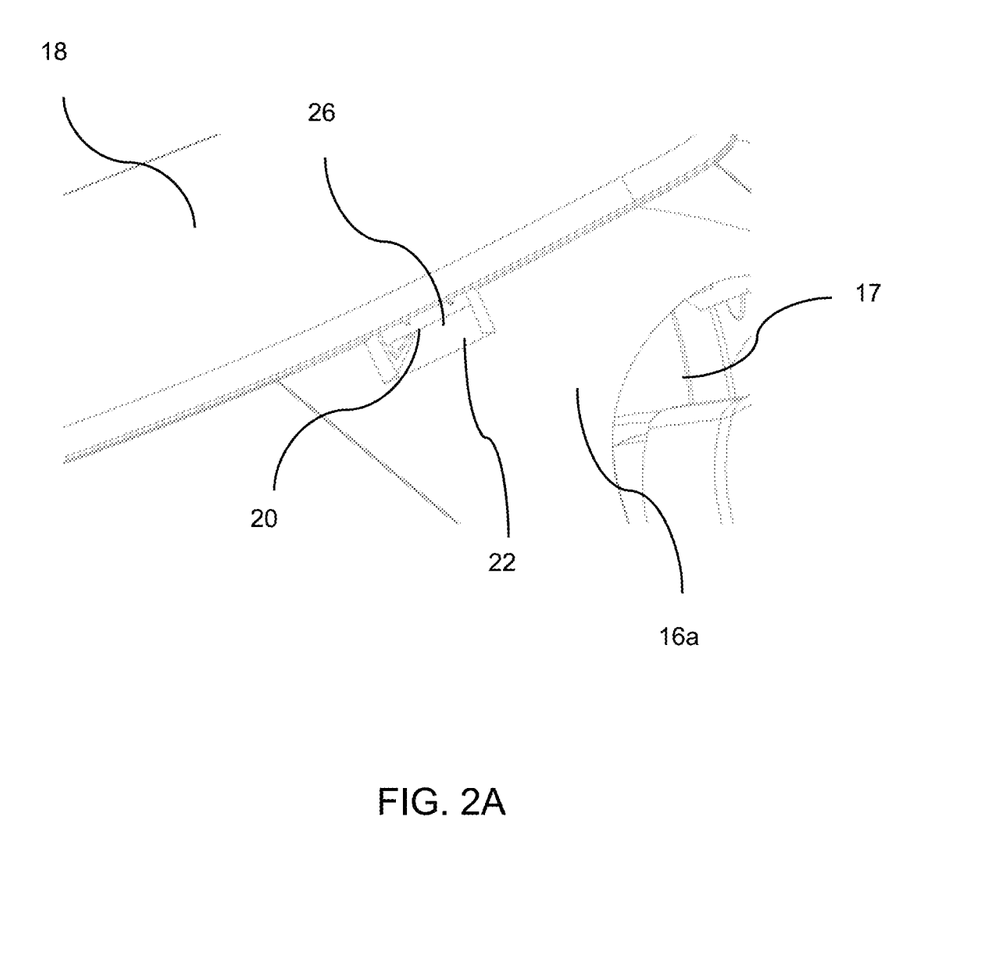
FIG. 2A is an enlarged perspective view of the area A in FIG. 2.
Figure 3:
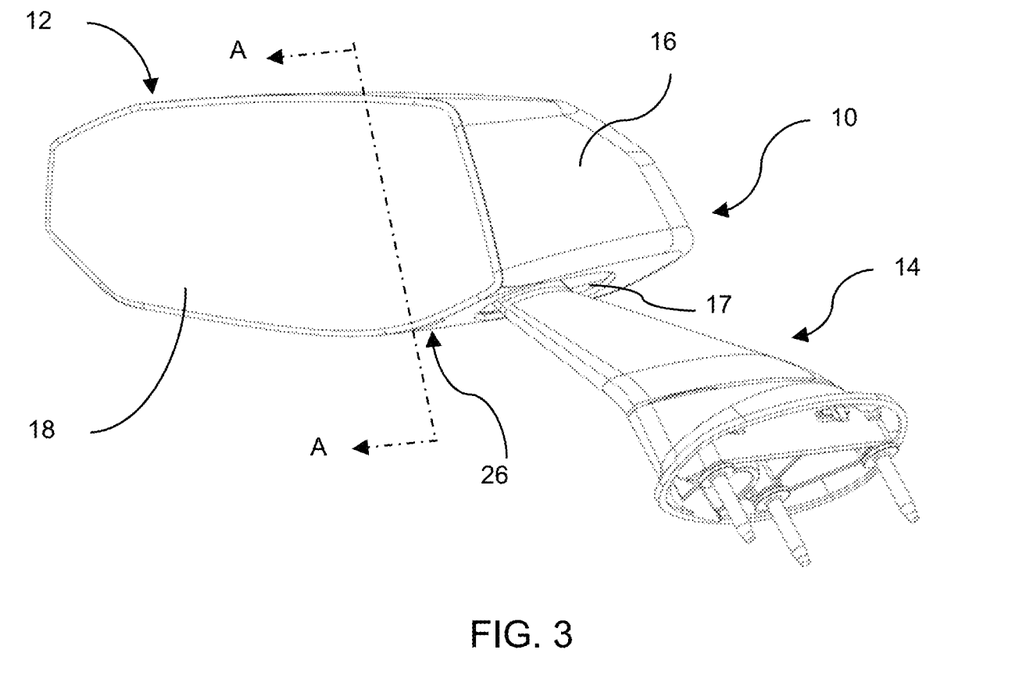
FIG. 3 is another perspective view of the exterior rearview mirror assembly of FIG. 1.
Figures 3A, 4:
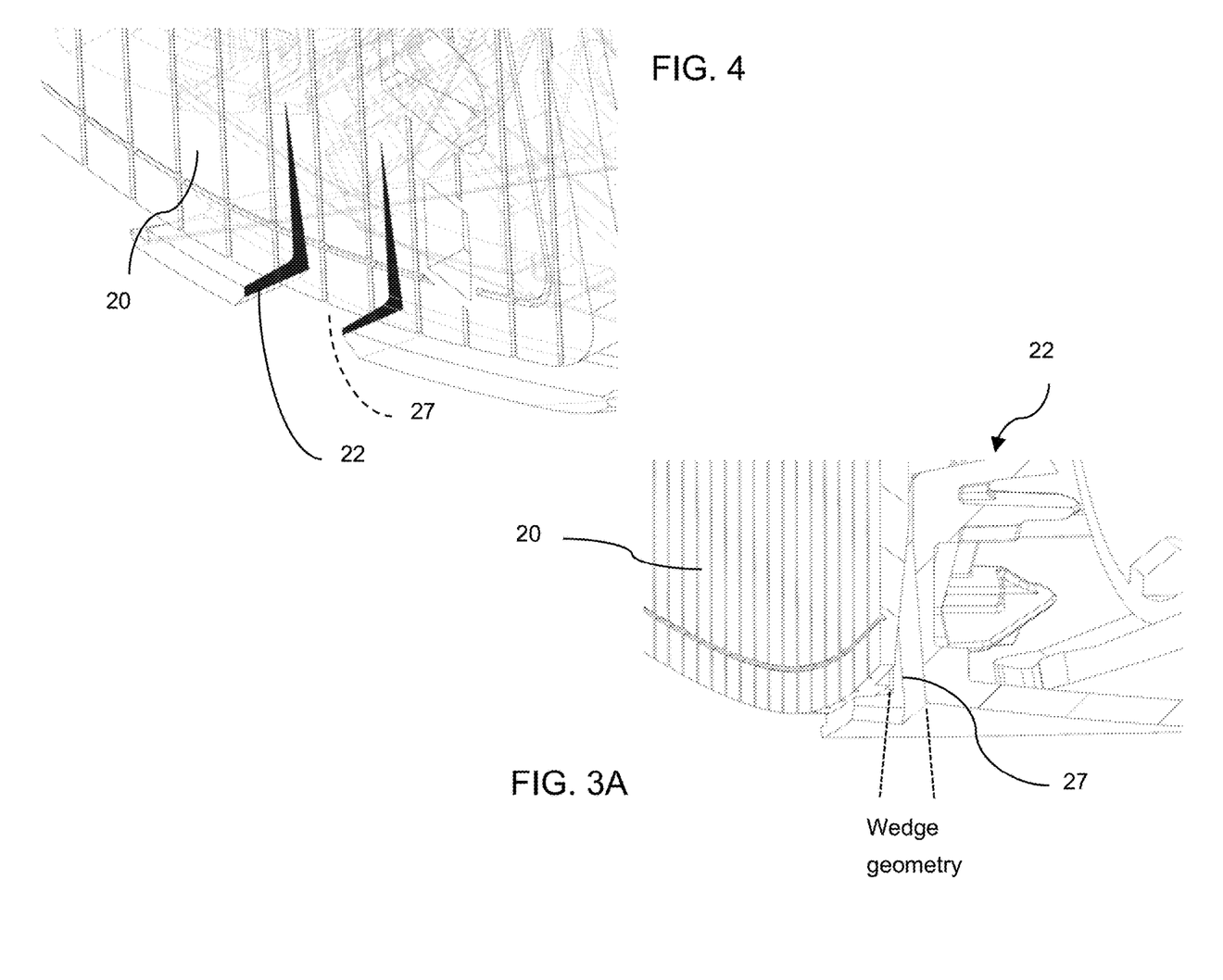
FIG. 3A is a perspective and partial sectional view of the exterior rearview mirror assembly, taken along the line A-A in FIG. 3.
FIG. 4 is a perspective view of the mirror back plate and head mounting plate at the service port.
Figure 5:
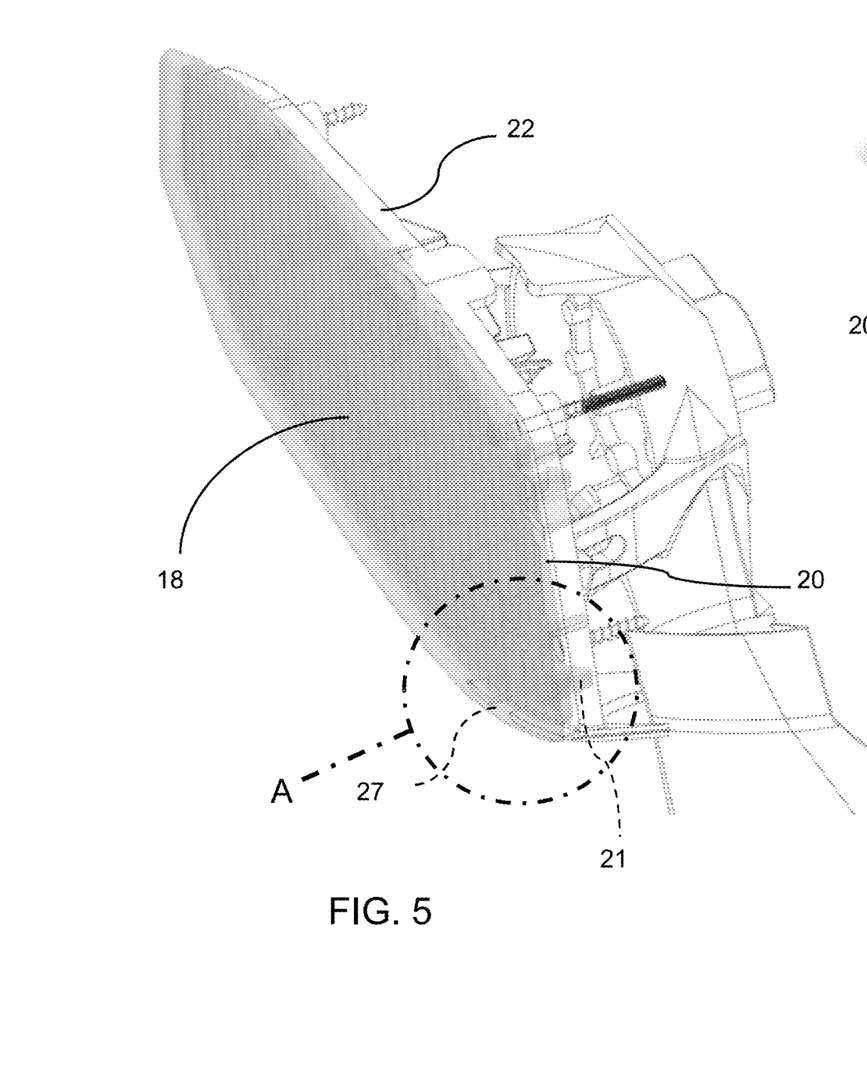
FIG. 5 is another perspective and sectional view of the exterior rearview mirror assembly.
Figure 5A:
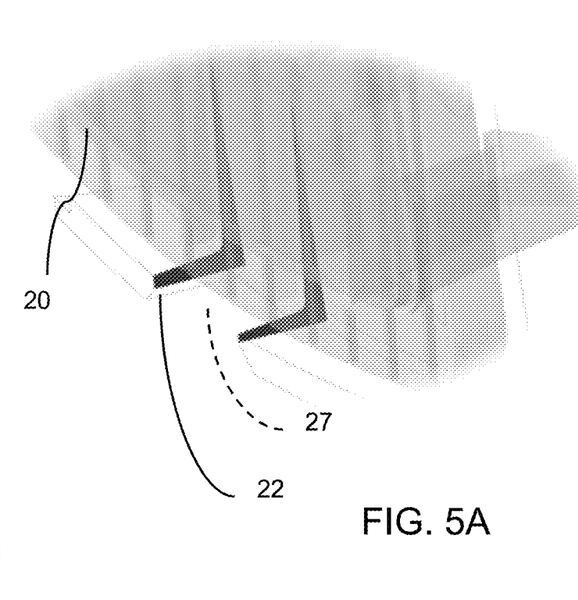
FIG. 5A is an enlarged view of the area A in FIG. 5.

In the illustrated embodiment (and such as seen in FIGS. 2 and 2A), the service port 26 is disposed at or established at and accessible at a lower portion or element or plate 16a of the mirror casing 16, which is attached (such as snap-attached) at the casing and/or at the head mounting plate 22 to cover at least a portion of a U-shaped recess at a lower portion or surface of the mirror casing 16. The portion of the U-shaped recess that remains uncovered when the plate 16a is disposed at the mirror casing 16 comprises an aperture 17 through which the mounting arm 14 extends into the mirror casing. The aperture 17 permits a range of motion of the mirror head 12 (and the mirror reflective element 18) relative to the mounting arm 14 so that the actuator may operably adjust the mirror head relative to the mounting arm without the casing engaging the mounting arm.

During assembly of the mirror assembly, the mounting arm or base 14, with the actuator and head mounting plate attached thereat, may be received in the U-shaped cutout at the lower region of the mirror casing. When the mounting arm is fully received in the cutout (and the actuator and the head mounting plate are in the mirror casing), the head mounting plate 22 attaches at the mirror casing 16 (and optionally other attaching elements of the actuator and/or head mounting plate may attach at the mirror casing), and the lower element or cover or plate 16a may be attached at the cutout region to close the mirror casing around the mounting arm that protrudes through the gap or aperture 17 at the lower region of the mirror casing 16. Optionally, the mirror assembly may be assembled by inserting the mounting arm through an aperture at the lower region of the mirror casing, instead of moving the arm along a slot or cutout, and then moving the actuator and attachment plate/mount plate into attachment with the mirror casing. The port or notch 26 may be formed at the lower casing element 16a or may be formed at the lower portion of the mirror casing 16. The mirror head and casing may also include a water drainage port at the lower region of the mirror head to drain water from the mirror head if any water enters the mirror head. The drainage port may be at the service port (such that the service port also provides the drainage port) or may be located elsewhere at the lower region of the mirror head.

Thus, the mirror reflective element 18 is attached at the back plate 20 (such as via an adhesive or tape or via an adhesively applied heater pad or the like), and the back plate 20 is snap-attached at the head mounting plate 22 via the snap tabs 21 protruding through openings in the head mounting plate 22 and engaging a surface of the head mounting plate to limit or preclude retraction of the tabs from the head mounting plate. The actuator adapter plate 24 may snap attach at the head mounting plate or may be fastened thereto via a plurality of fasteners and the actuator adapter plate may engage the back plate via a plurality of bosses 23. The actuator is mounted at the actuator adapter plate via fasteners or snap attachment or the like, whereby actuation of the actuator adjusts or moves the actuator adapter plate, the head mounting plate, the back plate, the reflective element, and the mirror casing, together and in tandem with one another, relative to the mounting portion or base portion. The mirror back plate (with the mirror reflective element attached thereat) is detachably attached at the head mounting plate and may be detached therefrom via movement of a tool or element (such as a separate element or an element that is integral with the mirror casing or head mounting plate) at a service port and wedge-shaped recess at which a separating force may be applied between the mirror back plate and head mounting plate to separate at least a portion of the back plate from the head mounting plate.

Thus, and such as described in U.S. Publication No. US-2020-0353867 (incorporated above), the mirror head 12 is adjustable relative to the base portion 14 (such as at an outer end portion of the base portion 14) via the actuator fixedly attached at a bracket portion of the mirror assembly. The mounting post or structure is received through or disposed at the gap or opening or aperture 17 of the mirror casing 16, with the opening providing clearance or a gap between the casing wall and the mounting post to allow for adjustment of the mirror casing and reflective element (the mirror head) relative to the base portion 14, without direct contact or fouling between the mirror casing and the base portion during mirror head adjustment (but optionally with sealing and/or sliding contact between a gasket or seal and the mirror casing and/or base portion, as discussed below). The mirror casing may be formed by polymeric molding (such as injection molding) and the opening or hole or aperture may be established through the mirror casing during the molding of the mirror casing.

The actuator is mounted at the upper end of mounting post or structure and is operable to adjust the head mounting plate and the mirror back plate and reflective element and mirror casing in tandem to adjust the rearward field of view of the reflective element as viewed by the driver of the vehicle. The actuator provides both vertical and horizontal adjustment of the mirror head relative to the base portion (e.g., up and down and side-to-side adjustment of the mirror head to vertically and/or horizontally adjust the field of view of the reflective element as viewed by the driver). The actuator may comprise two motors that are electrically operable to adjust the mirror head in two orthogonal directions. The mirror head 12 may also pivot about a generally vertical or canted pivot axis to provide a breakaway mirror configuration (and optionally, another actuator may be disposed at the base portion or bracket to provide a powerfold function).

The mirror actuator may comprise a two-motor actuator that is operable to pivot the mirror head horizontally and vertically via respective motors. The two-motor actuator may also be operable to pivot the mirror head relative to the base portion between a folded or non-use position and an extended or use position. The two-motor actuator, when electrically powered to horizontally adjust the mirror reflective element, pivots the mirror head at a rate that is slower than a rate of horizontally pivoting of the mirror head when pivoting the mirror head between the folded or non-use position and the extended or use position.

The exterior rearview mirror assembly of the present invention provides a frameless exterior rearview mirror assembly. The actuator adjusts the reflective element in tandem with the mirror casing, and the circumferential outermost perimeter edges of the outermost glass substrate of the mirror reflective element are exposed and contactable by a person and are rounded with a radius of curvature of at least 2.5 mm, such as 2.8 mm or thereabouts, so as to mitigate injury to that person upon contact.

Optionally, accessories, such as turn signal indicators or ground illumination lights or spotlights or cameras, can be disposed at the mounting arm/base attached at the vehicle so that any light beam axis or camera viewing axis remains unchanged when the mirror head adjusts relative to the mounting arm/base. The mirror assembly of the present invention allows for inclusion of other accessories (such as turn signal indicators, blind spot indicators, lights, displays and/or the like) in the mirror head, without concerns of interference with conventional actuators disposed in the mirror head and at and behind the mirror reflective element. Additionally, inclusion of other accessories, such as those that are behind or are visible through the mirror reflective element, may include electrical connection (such as via a wire and electrical connector) between the back plate and/or mirror reflective element and another component at the mirror head, but this will not interfere with the ability of the mirror reflective element (and back plate) to separate from the head mounting plate via insertion of a tool at the service port. The electrical connection may separate automatically when at least the lower portion of the back plate is separated from the head mounting plate or an operator or technician may manually disconnect the electrical connection after separating at least the lower portion of the back plate from the head mounting plate. The exterior rearview mirror assembly and/or actuators may utilize aspects of the exterior rearview mirror assemblies described in U.S. Pat. Nos. 9,827,913; 9,346,403; 9,067,541; 8,915,601; 8,764,256; 7,887,202; 7,722,199; 7,314,285; 7,267,449; 7,159,992; 7,104,663; 7,093,946; 7,090,363; 7,080,914; 7,073,914; 6,916,100; 6,755,544; 6,698,905; 6,685,864; 6,467,920; 6,362,548; 6,312,135; 6,243,218; 6,229,226; 6,213,612; 5,986,364; 5,900,999 and/or 5,703,731, and/or U.S. Publication No. US-2007-002477, which are all hereby incorporated herein by reference in their entireties.

Optionally, the reflective element may comprise a frameless reflective element, such as the types shown and/or described in U.S. Pat. Nos. 7,253,723; 8,154,418; 8,508,831; 8,730,553; 9,598,016 and/or 9,346,403, and/or U.S. Publication Nos. US-2014-0313563 and/or US-2015-0097955, which are hereby incorporated herein by reference in their entireties. In such an application, the mirror reflective element may have a rounded or ground perimeter edge region at its periphery of the front surface, and such a rounded or ground or polished perimeter edge region of the glass substrate of the reflective element may be exposed to or viewable by the driver of the vehicle and may comprise a polished perimeter that is polished to a water-clear finish and may have a radius of curvature of at least about 2.5 mm, such as about 2.8 mm or thereabouts. The rounded perimeter edge of the glass substrate of the mirror reflective element may provide a generally smooth or continuous transition from the generally planar (or slightly curved) front surface of the mirror reflective element to the outer surface of the mirror head or mirror casing at which the mirror reflective element is mounted. Optionally, the mirror reflective element may have a thin or very thin bezel at the perimeter region of the front surface of the reflective element, and optionally, the mirror reflective element may have a clear bezel at the perimeter region of the front surface of the reflective element, or the like, depending on the particular application of the mirror assembly and the desired appearance and/or styling of the mirror assembly.

Optionally, other mirror designs or configurations may be contemplated in accordance with the present invention, such as various configurations of the mirror casing and reflective element and any bezel at the mirror reflective element. For example, the mirror assembly may include a plastic molding that comprises a portion that (a) abuts a circumferential edge of the mirror glass substrate (such as the front glass substrate of an electrochromic mirror reflective element or a glass prism of a prismatic mirror reflective element) and (b) has an outer curved surface that extends from generally adjacent to a first surface of the glass substrate and that may lack a sharp edge, such as described in U.S. Pat. Nos. 7,255,541; 7,289,037; 7,360,932; 8,049,640 and/or 8,529,108, which are hereby incorporated herein by reference in their entireties. For example, the mirror back plate may include a perimeter lip that circumscribes a perimeter edge of the mirror reflective element, where no part of the perimeter lip overlaps or extends over any part of the front side of the mirror reflective element. The perimeter lip of the mirror back plate thus may provide a curved transition between the first side of the mirror reflective element and an outer surface of the mirror casing. Optionally, the mirror assembly may include a conventional bezel, such as described in U.S. Pat. No. 7,224,324, which is hereby incorporated herein by reference in its entirety.

Optionally, the mirror assembly may include various other features, such as lighting and/or indicators and/or blind spot detectors and/or wide angle reflectors or spotter mirrors and/or the like. For example, the mirror assembly may include any other electronic or mechanical content, such as, for example, a blind spot indicator and/or a turn signal indicator and/or an illumination module and/or wide angle reflector elements and/or the like (such as by utilizing aspects of the exterior mirror assemblies described in U.S. Pat. Nos. 8,786,704; 8,058,977; 7,944,371; 7,626,749; 7,492,281; 6,198,409; 5,929,786; 5,786,772; 7,581,859; 6,227,689; 6,582,109; 5,371,659; 5,497,306; 5,669,699; 5,823,654; 6,176,602; 6,276,821; 7,748,856; 7,255,451; 7,195,381; 6,717,712; 7,126,456; 6,315,419; 7,097,312 and/or 6,522,451, which are hereby incorporated herein by reference in their entireties).

Optionally, the mirror element may include a blind spot viewing auxiliary wide angle spotter mirror element that may be of the integrated type (such as described in U.S. Pat. No. 6,315,419 and/or U.S. Pub. No. US-2008-0225421, which are hereby incorporated herein by reference in their entireties) or that may be a coplanar type or a circular spotter type or a WIDEVUE™ type or construction (such as supplied by *Magna* Mirrors of America, Inc., of Holland, Mich.), such as in accordance with U.S. Pat. Nos. 6,522,451; 6,717,712; 7,167,294; 7,589,883 and/or 8,267,534, which are hereby incorporated herein by reference in their entireties. Also, the unitary reflective element sub-assembly may comprise an extended field of view mirror reflective element, such as a reflective element utilizing aspects of the mirrors described in U.S. Pat. No. 7,420,756, which is hereby incorporated herein by reference in its entirety.

The mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 8,503,061; 7,274,501; 7,255,451; 7,195,381; 7,184,190; 6,690,268; 5,140,455; 5,151,816; 6,420,036; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties.

Changes and modifications in the specifically described embodiments may be carried out without departing from the principles of the present invention, which is intended to be limited only by the scope of the appended claims as interpreted according to the principles of patent law.

The invention claimed is:

1. A vehicular exterior rearview mirror assembly, the vehicular exterior rearview mirror assembly comprising:
   a base portion and a mirror head;
   wherein the base portion is configured for attachment at an exterior portion of a vehicle equipped with the vehicular exterior rearview mirror assembly to mount the vehicular exterior rearview mirror assembly at the equipped vehicle;
   wherein the mirror head comprises a mirror reflective element;
   wherein the mirror reflective element comprises a front side and a rear side separated by a thickness dimension of the mirror reflective element;
   wherein, with the base portion attached at the exterior portion of the equipped vehicle, the front side of the mirror reflective element is viewable by a driver of the equipped vehicle when the driver is operating the equipped vehicle;
   wherein the mirror head comprises a mirror back plate having a front side and a rear side separated by a thickness dimension of the mirror back plate;
   wherein the rear side of the mirror reflective element is adhesively attached at the front side of the mirror back plate;
   wherein the base portion extends through an aperture in the mirror head;
   a mirror actuator within the mirror head, wherein the mirror actuator, when electrically operated, adjusts the mirror head relative to the base portion;
   wherein, when the mirror actuator is electrically operated, the mirror actuator moves the mirror head and the mirror reflective element together and in tandem relative to the base portion;
   wherein the aperture allows for movement of the mirror head relative to the base portion during operation of the mirror actuator;
   wherein the mirror head comprises a head mounting plate having a front side and a rear side separated by a thickness dimension of the head mounting plate;
   wherein the rear side of the head mounting plate is attached at the mirror actuator;
   wherein the rear side of the mirror back plate is detachably attached at the front side of the head mounting plate;
   wherein the mirror head includes a service recess at and between the mirror back plate and the head mounting plate, wherein the service recess is accessible from exterior the mirror head; and
   wherein the service recess is configured to enable detachment of the mirror back plate, with the mirror reflective element adhesively attached thereto, from the head mounting plate.

2. The vehicular exterior rearview mirror assembly of claim 1, wherein the mirror head has an access port to allow access to the service recess from exterior the mirror head.

3. The vehicular exterior rearview mirror assembly of claim 2, wherein the service recess comprises a wedge-shaped recess that has a wider cross-dimension at the access port and a narrower cross-dimension inward of the access port.

4. The vehicular exterior rearview mirror assembly of claim 1, wherein the service recess is configured to enable detachment of the mirror back plate from the head mounting plate via a detaching tool.

5. The vehicular exterior rearview mirror assembly of claim 4, wherein the detaching tool is configured to impart a force at and between the mirror back plate and the head mounting plate.

6. The vehicular exterior rearview mirror assembly of claim 5, wherein the detaching tool is part of the vehicular exterior rearview mirror assembly and is at least one selected from the group consisting of (i) movable relative to the mirror back plate to impart the force and (ii) movable relative to the head mounting plate to impart the force.

7. The vehicular exterior rearview mirror assembly of claim 1, wherein the rear side of the mirror back plate is snap-attached at the front side of the head mounting plate via a plurality of flexible elements at one selected from the group consisting of (i) the mirror back plate and (ii) the head mounting plate.

8. The vehicular exterior rearview mirror assembly of claim 7, wherein the service recess is configured to enable detachment of the mirror back plate from the head mounting plate via detachment of at least one of the plurality of flexible elements from the other of the one selected from the group consisting of (i) the mirror back plate and (ii) the head mounting plate.

9. The vehicular exterior rearview mirror assembly of claim 8, wherein, with the base portion attached at the exterior portion of the equipped vehicle, the service recess is accessible from exterior the mirror head at a lower portion of the mirror head, and wherein the force detaches at least one of the plurality of flexible elements at a lower portion of the mirror back plate.

10. The vehicular exterior rearview mirror assembly of claim 4, wherein the detaching tool is separate from the vehicular exterior rearview mirror assembly and is configured to be inserted into the service recess.

11. The vehicular exterior rearview mirror assembly of claim 1, comprising a flexible gasket at the aperture of the mirror head to limit intrusion of contaminants into the mirror head via the aperture into the mirror head with the vehicular exterior rearview mirror assembly mounted at the equipped vehicle, and wherein the flexible gasket allows for movement of the mirror head relative to the base portion.

12. The vehicular exterior rearview mirror assembly of claim 1, wherein the mirror back plate includes a perimeter lip that circumscribes a perimeter edge of the mirror reflective element, and wherein no part of the perimeter lip overlaps or extends over any part of the front side of the mirror reflective element, and wherein the perimeter lip of the mirror back plate provides a curved transition between the front side of the mirror reflective element and an outer surface of the mirror head.

13. The vehicular exterior rearview mirror assembly of claim 1, wherein the mirror reflective element comprises a glass substrate having a rounded front perimeter, and wherein, with the mirror reflective element attached at the mirror actuator, and with the vehicular exterior rearview mirror assembly mounted at the equipped vehicle, the rounded front perimeter of the glass substrate is exposed to and contactable by and viewable by the driver of the equipped vehicle, and wherein the rounded front perimeter of the glass substrate has a radius of curvature of at least 2.5 mm and provides a curved transition from the front side of the mirror reflective element and an outer surface of the mirror head.

14. The vehicular exterior rearview mirror assembly of claim 1, wherein at least part of the service recess is formed at the rear side of the mirror back plate.

15. The vehicular exterior rearview mirror assembly of claim 1, wherein at least part of the service recess is formed at the front side of the head mounting plate.

16. The vehicular exterior rearview mirror assembly of claim 1, wherein a part of the service recess is formed at the rear side of the mirror back plate and another part of the service recess is formed at the front side of the head mounting plate.

17. The vehicular exterior rearview mirror assembly of claim 1, wherein the mirror actuator comprises an actuator body and an adapter plate that is attached at the actuator body, wherein the actuator body is attached at an end region of the base portion that is within the mirror head.

18. The vehicular exterior rearview mirror assembly of claim 1, wherein, with at least the portion of the mirror back plate detached from the head mounting plate, the mirror back plate is detachable from the head mounting plate.

19. A vehicular exterior rearview mirror assembly, the vehicular exterior rearview mirror assembly comprising:
a base portion and a mirror head;
wherein the base portion is configured for attachment at an exterior portion of a vehicle equipped with the vehicular exterior rearview mirror assembly to mount the vehicular exterior rearview mirror assembly at the equipped vehicle;
wherein the mirror head comprises a mirror reflective element;
wherein the mirror reflective element comprises a front side and a rear side separated by a thickness dimension of the mirror reflective element;
wherein, with the base portion attached at the exterior portion of the equipped vehicle, the front side of the mirror reflective element is viewable by a driver of the equipped vehicle when the driver is operating the equipped vehicle;
wherein the mirror head comprises a mirror back plate having a front side and a rear side separated by a thickness dimension of the mirror back plate;
wherein the rear side of the mirror reflective element is adhesively attached at the front side of the mirror back plate;
wherein the mirror back plate includes a perimeter lip that circumscribes a perimeter edge of the mirror reflective element, and wherein no part of the perimeter lip overlaps or extends over any part of the front side of the mirror reflective element, and wherein the perimeter lip of the mirror back plate provides a curved transition between the front side of the mirror reflective element and an outer surface of the mirror head;
wherein the base portion extends through an aperture in the mirror head;
a mirror actuator within the mirror head, wherein the mirror actuator, when electrically operated, adjusts the mirror head relative to the base portion;
wherein, when the mirror actuator is electrically operated, the mirror actuator moves the mirror head and the mirror reflective element together and in tandem relative to the base portion;
wherein the aperture allows for movement of the mirror head relative to the base portion during operation of the mirror actuator;
wherein the mirror head comprises a head mounting plate having a front side and a rear side separated by a thickness dimension of the head mounting plate;
wherein the rear side of the head mounting plate is attached at the mirror actuator;
wherein the rear side of the mirror back plate is detachably attached at the front side of the head mounting plate;
wherein the mirror head includes a service recess at and between the mirror back plate and the head mounting plate, wherein the service recess is accessible from exterior the mirror head;
wherein at least part of the service recess is at least one selected from the group consisting of (i) formed at the rear side of the mirror back plate and (ii) formed at the front side of the head mounting plate; and
wherein the service recess is configured to enable detachment of the mirror back plate, with the mirror reflective element adhesively attached thereto, from the head mounting plate.

20. The vehicular exterior rearview mirror assembly of claim 19, wherein the service recess is configured to enable detachment of the mirror back plate from the head mounting plate via a detaching tool.

21. The vehicular exterior rearview mirror assembly of claim 20, wherein the detaching tool is configured to impart a force at and between the mirror back plate and the head mounting plate.

22. The vehicular exterior rearview mirror assembly of claim 21, wherein the detaching tool is part of the vehicular exterior rearview mirror assembly and is at least one selected from the group consisting of (i) movable relative to the mirror back plate to impart the force and (ii) movable relative to the head mounting plate to impart the force.

23. The vehicular exterior rearview mirror assembly of claim 20, wherein the detaching tool is separate from the vehicular exterior rearview mirror assembly and is configured to be inserted into the service recess.

24. The vehicular exterior rearview mirror assembly of claim 19, comprising a flexible gasket at the aperture of the mirror head to limit intrusion of contaminants into the mirror head via the aperture into the mirror head with the vehicular exterior rearview mirror assembly mounted at the equipped vehicle, and wherein the flexible gasket allows for movement of the mirror head relative to the base portion.

25. A vehicular exterior rearview mirror assembly, the vehicular exterior rearview mirror assembly comprising:

a base portion and a mirror head;

wherein the base portion is configured for attachment at an exterior portion of a vehicle equipped with the vehicular exterior rearview mirror assembly to mount the vehicular exterior rearview mirror assembly at the equipped vehicle;

wherein the mirror head comprises a mirror reflective element;

wherein the mirror reflective element comprises a front side and a rear side separated by a thickness dimension of the mirror reflective element;

wherein, with the base portion attached at the exterior portion of the equipped vehicle, the front side of the mirror reflective element is viewable by a driver of the equipped vehicle when the driver is operating the equipped vehicle;

wherein the mirror head comprises a mirror back plate having a front side and a rear side separated by a thickness dimension of the mirror back plate;

wherein the rear side of the mirror reflective element is adhesively attached at the front side of the mirror back plate;

wherein the base portion extends through an aperture in the mirror head;

a mirror actuator within the mirror head, wherein the mirror actuator, when electrically operated, adjusts the mirror head relative to the base portion;

wherein, when the mirror actuator is electrically operated, the mirror actuator moves the mirror head and the mirror reflective element together and in tandem relative to the base portion;

wherein the aperture allows for movement of the mirror head relative to the base portion during operation of the mirror actuator;

wherein the mirror head comprises a head mounting plate having a front side and a rear side separated by a thickness dimension of the head mounting plate;

wherein the rear side of the head mounting plate is attached at the mirror actuator;

wherein the rear side of the mirror back plate is detachably attached at the front side of the head mounting plate via a plurality of flexible elements at one selected from the group consisting of (i) the mirror back plate and (ii) the head mounting plate;

wherein the mirror head includes a service recess at and between the mirror back plate and the head mounting plate, wherein the service recess is accessible from exterior the mirror head;

wherein at least part of the service recess is at least one selected from the group consisting of (i) formed at the rear side of the mirror back plate and (ii) formed at the front side of the head mounting plate; and wherein the service recess is configured to enable detachment of the mirror back plate, with the mirror reflective element adhesively attached thereto, from the head mounting plate via a detaching tool that is configured to impart a force at and between the mirror back plate and the head mounting plate to detach at least one of the plurality of flexible elements from the other of the one selected from the group consisting of (i) the mirror back plate and (ii) the head mounting plate.

26. The vehicular exterior rearview mirror assembly of claim 25, wherein the detaching tool is part of the vehicular exterior rearview mirror assembly and is at least one selected from the group consisting of (i) movable relative to the mirror back plate to impart the force and (ii) movable relative to the head mounting plate to impart the force.

27. The vehicular exterior rearview mirror assembly of claim 25, wherein a flexible gasket is disposed at the aperture of the mirror head to limit intrusion of contaminants into the mirror head via the aperture into the mirror head with the vehicular exterior rearview mirror assembly mounted at the equipped vehicle, and wherein the flexible gasket allows for movement of the mirror head relative to the base portion.

28. The vehicular exterior rearview mirror assembly of claim 25, wherein the mirror back plate includes a perimeter lip that circumscribes a perimeter edge of the mirror reflective element, and wherein no part of the perimeter lip overlaps or extends over any part of the front side of the mirror reflective element, and wherein the perimeter lip of the mirror back plate provides a curved transition between the front side of the mirror reflective element and an outer surface of the mirror head.

29. The vehicular exterior rearview mirror assembly of claim 25, wherein, with the base portion attached at the exterior portion of the equipped vehicle, the service recess is accessible from exterior the mirror head at a lower portion of the mirror head, and wherein the detaching tool detaches at least one of the plurality of flexible elements at a lower portion of the mirror back plate.

30. The vehicular exterior rearview mirror assembly of claim 25, wherein at least part of the service recess is at least one selected from the group consisting of (i) formed at the rear side of the mirror back plate and (ii) formed at the front side of the head mounting plate.

* * * * *